United States Patent Office 3,183,283
Patented May 11, 1965

3,183,283
BLENDS OF LOW MOLECULAR WEIGHT, HIGHLY BRANCHED POLYETHYLENES WITH HIGH MOLECULAR WEIGHT, SPARSELY BRANCHED POLYETHYLENES
Frederick P. Reding, Charleston, W. Va., assignor to Union Carbide Corporation, a corporation of New York
No Drawing. Filed Jan. 8, 1958, Ser. No. 707,668
6 Claims. (Cl. 260—897)

This invention relates to compositions of matter consisting of solid polymers of ethylene. More particularly it is concerned with mixtures of moderately branched to linear, high molecular weight ethylene polymers with highly branched, low molecular weight ethylene polymers, said mixtures having improved environmental stress cracking and skinning properties and improved processing characteristics.

Polyethylene can be produced by many procedures, and depending upon the catalyst employed and the reaction conditions used, the resin can be obtained containing an appreciable degree of branching or as an essentially linear, sparsely branched product free of any significant amount of branching. Thus, for example, the high temperature, high pressure process described in U.S. Patent 2,188,465 produces a resin which is more highly branched than the resin which is produced by the recently disclosed Ziegler process, which is a low temperature, low pressure process using a catalyst complex which is a mixture of alkyl compounds of Groups IA, IIA and IIIA of the Periodic System with the halides of the transition metals of Groups IVB, VB and VIB of the Periodic System. The degree of branching present in a polymer sample is determined by infra-red analysis, which measures the number of methyl groups attached to the polymer chain per 100 carbon atoms in the chain.

The high pressure, high temperature polymerization processes produce polyethylene ranging in melt index from about 0.05 to about 100,000 decigrams per minute, and densities up to about 0.92 gram per cc. These resins are usually highly branched, and generally have a degree of branching, or methyl group content, of from about 1 to about 10 or more methyl groups per 100 carbon atoms. The polymers so produced also have a broad molecular weight distribution, i.e., the polymeric mixture contains resin molecules which can vary in molecular weight from greasy to wax-like products having average molecular weights of from about 1000 or less to about 5000 to solid products having average molecular weights of from about 5000 to about 75,000, and in some instances may be as high as several hundred thousand or more. As is known, the average molecular weight of the polyethylene is inversely proportional to the melt index thereof; therefore, by measuring the melt index of a sample, by the method of A.S.T.M. D1238–52T, one can determine the average molecular weight. It must be noted, however, that in some instances, where operating conditions are closely controlled and regulated, that it is possible to produce more nearly linear, high molecular weight polyethylene having densities up to about 0.93, melt indexes between about 0.1 and 100,000 decigrams per minute, and a degree of branching below about one methyl group per 100 carbon atoms. The literature is replete with references describing processes which will produce highly branched, low molecular weight polyethylene; and the manner of preparation of these polymers is immaterial for the purposes of this invention.

The Ziegler process, on the other hand, generally produces a nearly linear, high molecular weight product having densities up to about 0.97, melt indexes of from about 0.01 or less to about 100,000 decigrams per minute and a degree of branching below about 0.5 methyl group per 100 carbon atoms. In addition, many other processes are known which will produce nearly linear, high molecular weight polyethylene, some of them high pressure, intermediate temperature processes; and again the manner of preparation of these polymers is immaterial for the purposes of this invention.

When subjected to prolonged stress, particularly in the presence of polar materials, polyethylenes produced by processes such as those described above, suffer a brittle fracture. This phenomenon, which is commonly referred to as environmental stress cracking, has been a serious deterrent to the use of polyethylene produced by the high temperature, high pressure processes in wire and cable applications where long and dependable life of the protective coating is necessary. To overcome this defect, the use of high molecular weight polyethylene has been resorted to. However, the use of such high molecular weight resin is undesirable since it is very difficult to extrude or fabricate without the use of special equipment, and a high energy consumption is required to operate the necessary equipment. It is also known that narrowing the molecular weight distribution of the polyethylene will reduce the environmental stress cracking deficiency. However, the production of such resins requires special techniques and careful reaction control resulting in production rates which are significantly lower than desirable. A still further approach used to solve the stress cracking problem is the addition of synthetic and natural rubbers to the polyethylene. This, however, has several disadvantages in that the amount which can be added without prohibitively degrading such properties as heat and light resistance, clarity, chemical resistance, rigidity, etc. is limited; also injection molded articles prepared therewith "skin" badly, i.e., a surface layer delaminates and separates away from the piece, and the product becomes unacceptable.

It has now been found that mixtures containing polyethylene having a high average molecular weight (low melt index) and a low degree of branching with a branched polyethylene having a low molecular weight (high melt index) and a high degree of branching have improved environmental stress cracking and skinning properties, and that such mixtures can be readily extruded and fabricated in conventional equipment. What has been found is that when low molecular weight, highly branched polyethylene is mixed with high molecular weight polyethylene having a low degree of branching, the environmental stress crack resistance of the high molecular weight material is to a large extent retained but the mixture is much more processable. It was also found that in this manner resin mixtures could be prepared which had environmental stress cracking resistances substantially superior to those of resins of equal extrudability characteristics or melt index made by direct polymerization, including polyethylenes having narrow molecular weight distribution produced by direct polymerization to the same melt index. This finding is especially surprising and unexpected in view of the fact that modification of the high molecular weight resins by the methods herein disclosed is tantamount, in effect, to broadening the molecular weight distribution of the resin by adding a low molecular weight component thereto, which decreases the average molecular weight of the polyethylene mixture, each of which actions normally tends, individually, to decrease the environmental stress cracking resistance.

The plasticity characteristics of the new polyethylene resin compositions of this invention are much superior to those of the high molecular weight resin component by itself. Consequently, the processability and forming characteristics are much improved, and the new compositions are more readily molded, extruded, etc. at faster rates and lower temperatures. Also, the products produced are less prone to skinning.

By the term "low molecular weight, highly branched polyethylene" is meant a resin having a melt index above about 100 decigrams per minute and a degree of branching above about 2 methyl groups per 100 carbon atoms. The preferred low molecular weight, highly branched polyethylenes are those having a melt index of from about 200 to about 100,000 decigrams per minute and a degree of branching of from about 3 to about 10 methyl groups per 100 carbon atoms.

The "high molecular weight polyethylenes having a low degree of branching" are those resins having a melt index below about 4 decigrams per minute and a degree of branching below about 2 methyl groups per 100 carbon atoms. The preferred high molecular weight resins are those having a melt index below about 4 decigrams per minute and a degree of branching of not more than about 1.5 methyl groups per 100 carbon atoms, and a relatively narrow molecular weight distribution.

The improved mixtures of this invention can be produced by admixing from about 2 to about 50 parts by weight of the low molecular weight, highly branched polyethylene, preferably from about 5 to 25 parts by weight, with from about 50 to about 98 parts by weight of the sparsely branched, high molecular weight polyethylene, preferably from about 75 to 95 parts by weight. These mixtures have densities of from about 0.915 to 0.935 gram per cc. and a melt index of from about 0.1 to 18 decigrams per minute.

Those compositions containing from about 80 to 95 parts by weight of sparsely branched, high molecular weight resin (preferably from about 90 to 95 parts) having a density of from about 0.916 to 0.94 gram per cc. (preferably from about 0.92 to 0.923 gram per cc.) and a melt index of from about 0.002 to 0.5 decigram per minute (preferably from about 0.01 to 0.1 decigram per minute) with from about 5 to 20 parts by weight of low molecular weight, highly branched polyethylene (preferably from about 5 to 10 parts) having a density of from about 0.86 to 0.91 gram per cc. (preferably from about 0.88 to 0.90 gram per cc.) and a melt index above about 120 decigrams per minute preferably from about 200 to 20,000 decigrams per minute are especially preferred for wire and cable insulation and jacket extrusion compounds and for molding compositions. These improved compositions generally have densities of from about 0.916 to 0.93 gram per cc. (preferably from about 0.918 to 0.928 gram per cc.) and a melt index of from about 0.1 to 3.5 decigrams per minute (preferably from about 0.1 to 0.5 decigram per minute).

For injection molding applications, it has been found that those compositions containing from about 80 to 90 parts by weight of sparsely branched, high molecular weight resin having a density of from about 0.92 to 0.94 gram per cc. (preferably 0.923 to 0.928 gram per cc.) and a melt index of about 0.5 to 4 decigrams per minute (preferably from about 0.9 to 2.5 decigrams per minute) with from about 10 to 20 parts by weight of low molecular weight, highly branched polyethylene having a density of from about 0.86 to 0.91 gram per cc. (preferably from about 0.90 to 0.91 gram per cc.) and a melt index above about 1500 decigrams per minute (preferably from about 1500 to 10,000 decigrams per minute) are especially preferred for injection molding compositions. These improved compositions generally have densities of from about 0.920 to 0.935 gram per cc. (preferably from about 0.921 to 0.928 gram per cc.) and a melt index of from about 4 to 18 decigrams per minute (preferably from about 6 to 10 decigrams per minute).

It is to be understood that the mixtures of this invention can be prepared using polyethylenes modified with other monomers polymerizable with ethylene, or with polymers which have been prepared in the presence of chain terminators or telomer-forming compounds. The new compositions may also contain stabilizers against heat, light and oxygen, pigments, dyes, carbon black, clays, anti-blocking agents, lubricants, colorants and other modifiers generally incorporated into polyethylene resins.

The new compositions of this invention can be prepared by any of the procedures ordinarily used to mix and compound polyethylene compositions. For example, the various components can be mixed together in a ribbon blender, Hobart mixer, paddle blender or the like. It is generally preferred to conduct at least a portion of the mixing at a temperature high enough to flux the polyethylene resins in the mixture, whereby better uniformity and product homogeneity are achieved. The hot mixing can be performed satisfactorily in a Banbury mixer, on a two roll mill, in a compounding extruder, or with such other means as are well known to those familiar with the art. In some instances a portion of the compounding operation can be combined with the forming operation, as for example by accomplishing the final mixing and plasticating in the barrel of the forming extruder.

As an illustration of this invention, three polyethylene resins, all having the same melt index or equal extrudability and the same average degree of branching were tested for environmental crack resistance. The test used in this instance was that described by De Coste, Malm and Walder, Industrial and Engineering Chemistry, 43, 117 (1951), wherein a test specimen 0.5 by 1.5 inches with a thickness of 0.125±0.005 inch and having an 0.75 inch long slit 0.020 to 0.025 inch thick cut along its face is inserted in a U position, with the slit facing outward, in a polar solvent contained in a test tube at 50° C. The time required for cracking to occur is an indication of the crack resistance of the polymer. The polar solvent employed in this test method was Igepal A, an alkylphenoxy polyoxyethylene ethanol, and in general 12 samples of each resin were tested, and the percentage of failures at various times after the start of the test was reported.

The first polyethylene sample (Sample A) tested was a resin produced by polymerization by a high temperature and high pressure process, which is available commercially as Bakelite Polyethylene DYNH (registered trademark). This resin had an average molecular weight of about 20,000, a melt index of 2.0 decigrams per minute and a degree of branching of 1.8 methyl groups per 100 carbon atoms as measured by infrared.

The second polyethylene sample (Sample B) tested was prepared by fractionating Bakelite Polyethylene DYNH into three fractions, a high (1), an intermediate (2) and a low (3) molecular weight fraction by the technique of M. L. Nicolas, Comp. Rendus, 236, 809 (1953). These fractions were observed to have the same degree of branching and the following other characteristics:

| Fraction | 1 | 2 | 3 |
|---|---|---|---|
| Average molecular weight | 37,000 | 20,000 | 8,000 |
| Melt index, dgm./min. | 0.02 | 2.0 | ca. 20,000 |
| CH$_3$ groups/100 C atoms | 1.8 | 1.8 | 1.8 |

A mixture was then prepared by mixing about 50 parts of Fraction 1 with about 50 parts of Fraction 3, so that the mixture had a melt index of 2 decigrams per minute, that is, the same melt index as the original Bakelite Polyethylene DYNH. Thus this mixture had the same melt index and degree of branching as Bakelite Polyethylene DYNH, but it was in fact a mixture of the low molecular weight fraction and the high molecular weight fraction obtained by fractionation of DYNH.

The third polyethylene sample (Sample C) tested was prepared by mixing about 20 parts of a directly polymerized resin, i.e., the resin as produced, of low molecular weight and high degree of branching with about 25 parts of a directly polymerized resin of high molecular weight and low degree of branching. The low molecular weight, highly branched polyethylene used in this instance had a melt index of about 10,000 decigrams per minute, a density of about 0.905 gram per cc. and a degree of branching of 5 methyl groups per 100 carbon atoms. The high molecular weight, sparsely branched polyethylene had a melt index of 0.15 decigram per minute, a density of about 0.921 gram per cc. and a degree of branching of 0.8 methyl group per 100 carbon atoms. The mixture obtained had a melt index of 2 decigrams per minute and an average degree of branching of about 1.8 methyl groups per 100 carbon atoms. Thus this mixture was essentially identical in melt index and degree of branching to Samples A and B, but it was in fact a mixture of very highly branched, low molecular weight polyethylene with high molecular weight, sparsely branched polyethylene, wherein both polyethylene samples had been produced by direct polymerization and were not fractions separated from a directly polymerized polyethylene.

When the three samples were tested for environmental stress cracking, it was found that all twelve test specimens of Sample A failed within one hour of testing. The specimens of Sample B, which was prepared by mixing the high and low molecular weight fractions obtained by fractionation of Sample A, were even poorer in stress cracking properties, and all twelve test specimens failed within one-half hour. This shows that mixing high and low molecular weight resins of about equal, intermediate levels of branching does not improve environmental stress crack resistance. However, the test specimens of Sample C showed only a 66% failure after 2½ hours of testing; illustrating the superiority of mixtures of highly branched, low molecular weight polyethylenes with high molecular weight, sparsely branched polyethylenes. This information is summarized in the following table:

| Sample | A | B | C |
|---|---|---|---|
| Density, g./cc. | | | |
| Melt index, dgm./min. | 2.0 | 2.0 | 2.0 |
| Average molecular weight | 20,000 | 20,000 | 20,000 |
| CH₃ groups/100 C atoms | 1.8 | 1.8 | 1.8 |
| Percentage failures in time: | | | |
| ¼ hour | 0 | 8 | 0 |
| ½ hour | 8 | 100 | 0 |
| 1 hour | 100 | | 0 |
| 1½ hours | | | 8 |
| 2 hours | | | 33 |
| 2½ hours | | | 50 |
| | | | 66 |

In the following examples the test procedures used to characterize the polyethylene compositions were the following.

Melt index: ASTM D-1238-52T.

Density: Method described in Journal of Polymer Science, 21, 144 (1956).

Tensile strength, ultimate elongation and yield strength: ASTM D-412-51T.

Shear strength: ASTM D-732-46.

Extrudability: As described in Example 1.

80% brittleness index: ASTM D-746-55T, except that temperature at which 80 percent of the samples passed is recorded.

Deformation: A 3 inch length of the insulated wire obtained in the Extrudability Test is stripped to leave a one inch long span of insulation in the center, and the diameters of the conductor (C) and the insulation (D) are measured. The specimen is pre-heated for ten minutes in an air oven set at the test temperature and a 500 gram load is applied for one hour at the test temperature. The diameter of the insulation is re-measured, $d$, and the percent deformation calculated from the formula—

$$\text{Percent deformation} = \frac{D-d}{D-C} \times 100$$

Stress cracking: ASTM Bulletin, pp. 25-26 (December 1956), with the following exceptions: (1) 20 specimens were used in each test; (2) compression molded specimens were annealed 7 days in a 70° C. air oven or as indicated; (3) injection molded specimens were neither annealed nor slit; (4) $F_{20}$, $F_{50}$, etc. refer to the times at which 20%, 50%, etc. of the test specimens cracked, as determined from a graph of percent of specimens failing vs. immersion time; (5) $F_0$ is the time at which the first failure occurred.

Igepal CA-630 is essentially iso-octylphenoxy polyoxyethylene ethanol, and Hostapal HL is the trade name of a surfactant.

The following examples further serve to illustrate this invention. Parts are by weight unless otherwise specified.

*Example 1*

A mixture of 90 parts of a high molecular weight polyethylene resin having a melt index of 0.08 decigram per minute, a density of 0.922 gram per cc. and a degree of branching of about 0.9 methyl group per 100 carbon atoms and 0.1 part of 4,4'-thiobis-(6-tertiary-butyl-m-cresol) as antioxidant was mixed and fluxed in a Banbury mixer for 5 minutes under a ram pressure of 30 p.s.i. and with cooling water circulating through the Banbury jacket and rotor, at such a rate that the temperature of the mass rose gradually to about 150° C. during this period. Ten parts of a low molecular weight, highly branched polyethylene having a melt index of 20,000 decigrams per minute, a density of 0.88 gram per cc. and a degree of branching of about 8 methyl groups per 100 carbon atoms was then added and the overall mixture was banburied an additional four minutes at which time the temperature was 165° C. The hot plastic mass was then transferred to a two roll mill whose front and back rolls were maintained at 125° C. and 105° C., respectively, sheeted and end-passed five times through the mill bight. The sheet was air cooled and granulated. The mixture had a melt index of 0.3 decigram per minute and a density of 0.919 gram per cc. (Sample 1A). A portion of the granules was compression molded at 175° C. and 5,000 p.s.i. into 8 inch square by 0.125 inch thick plaques, which were used for testing. Another portion was extruded into 32 mil thick insulation onto No. 14 AWG solid copper wire to determine extrudability. A No. 1 Royle, 2 inch diameter extruder having a 5.4:1 compression ratio screw and equipped with a 128 mil diameter wire coating die was used. The screw speed was 50 r.p.m., the wire was pre-heated to 300° F. and the extruder was at about 400° F.

For comparison 100 parts of a commercially available polyethylene having a melt index of 0.3 decigram per minute, a density of 0.919 gram per cc. and a degree of branching of about 1.3 methyl groups per 100 carbon atoms was processed and tested in the same manner; this sample also contained the same amount of the same antioxidant (Sample 1B).

The results on the above samples is tabulated below:

| Sample | A | B |
|---|---|---|
| Melt index | 0.3 | 0.3 |
| Density | 0.919 | 0.919 |
| Tensile strength, p.s.i. | 2,400 | 2,200 |
| Ultimate elongation, percent | 650 | 650 |
| Yield strength, p.s.i. | 1,380 | 1,340 |
| Shear strength, p.s.i. | 2,500 | 2,500 |
| 80% brittleness index, °C. | −85 | −95 |
| Deformation (of 32 mil insulation under 500 g. load), percent: | | |
| At 105° C. | 0 | 0 |
| At 110° C. | 25 | 30 |
| At 115° C. | 100 | 100 |
| Power factor, at 50 mc. | 0.0003 | 0.0003 |
| Dielectric constant, at 50 mc. | 2.28 | 2.29 |
| Stress cracking ($F_{50}$), hrs.: | | |
| In Igepal CA630 | >500 | 60-85 |
| In Hostapal HL | >500 | <1 |
| Extrudability, lbs./H.P. hr. | 5.5 | 5.5 |

*Example 2*

Additional mixtures were prepared by the procedures described in Example 1 and compared with a commercially available polyethylene (Sample A) having a melt index of 0.6 decigram per minute and a density of 0.919 gram per cc., which was also treated as described in Example 1. The information is summarized in the following table, wherein one can readily see the great improvement achieved in the environmental stress cracking properties of the mixtures of this invention (Samples B to F) over the commercially available polyethylene.

| Sample | A | B | C | D | E | F |
|---|---|---|---|---|---|---|
| Composition, in parts per 100: | | | | | | |
| Resin 1 (M.I. 20,000; D. 0.88) | | 10 | | | | |
| Resin 2 (M.I. 3,000; D. 0.909) | | | 10 | | 20 | |
| Resin 3 (M.I. 200; D. 0.91) | | | | 10 | | 20 |
| Resin 4 (M.I. 0.6; D. 0.919) | 100 | | | | | |
| Resin 5 (M.I. 0.12; D. 0.921) | | 90 | 90 | 90 | 80 | 80 |
| Antioxidant | 0.05 | 0.05 | 0.05 | 0.05 | 0.05 | 0.05 |
| Melt index of mixture, dgm./min. | | 0.28 | 0.27 | 0.24 | 0.68 | 0.46 |
| Density of mixture, g./cc. | | 0.921 | 0.921 | 0.921 | 0.92 | 0.92 |
| Tensile strength, p.s.i. | | 2,400 | 2,400 | 2,500 | 2,000 | 2,200 |
| Ultimate elongation, percent | | 760 | 700 | 700 | 680 | 700 |
| Yield strength, p.s.i. | | 1,350 | 1,400 | 1,420 | 1,270 | 1,350 |
| Shear strength, p.s.i. | | 2,350 | 2,400 | 2,650 | 2,250 | 2,500 |
| 80% brittleness index, °C. | | −97 | −105 | <−105 | −85 | −100 |
| Deformation: | | | | | | |
| Percent at 105° C. | | 0 | 0 | 0 | 9 | 5 |
| Percent at 110° C. | | 16 | .36 | 26 | 34 | 32 |
| Stress cracking, after preconditioning 14 days at 70° C. ($F_{50}$, in Igepal CA630), hrs. | ca. 1.5 | Over 504 | | | | 350 |

*Example 3*

A mixture consisting of 80 parts of a sparsely branched, high molecular weight polyethylene having a melt index of 2.05 decigrams per minute and a density of 0.927 gram per cc. and 20 parts of a low molecular weight, highly branched polyethylene having a melt index of about 20,000 decigrams per minute, a density of 0.88 gram per cc. and a degree of branching of about 8 methyl groups per 100 carbon atoms was dry blended for 5 minutes, and then fluxed and compounded for 12 minutes in a Banbury mixture under a ram pressure of 30 p.s.i. to a maximum temperature of 155° C. The hot plastic mass was then sheeted by passing through a two roll mill ten times, air cooled and granulated (Sample A). The granules were injection molded into rectangular plaques 5⅜ inches by 1¾ inches having a 30 mil thick ⅝ inch by 1¾ inches center section and two 70 mil thick 2⅜ inches by 1¾ inches end sections under the following conditions: stock temperature, 500° F.; mold temperature, 110° F.; dwell time, 30 seconds; cooling time, 10 seconds; overall molding cycle, 45 seconds. The properties of the mixture are compared below with the properties of the unmodified sparsely branched, high molecular weight polyethylene used in preparing the mixture (Sample B). The improved environmental stress cracking properties and moldability are clearly evident.

| Sample | A | B |
|---|---|---|
| Melt index, dgm./min. | 7.9 | 2.0 |
| Density, g./cc. | 0.925 | 0.927 |
| Stress cracking, hrs.:[1] | | |
| $F_0$ | | <0.1 |
| $F_{20}$ | 4.0 | |
| $F_{50}$ | 48 | 0.2 |
| $F_{80}$ | >336 | |
| MPTF, p.s.i.[2] | 3,750 | 8,000 |

[1] Specimens 1.5″ x 0.5″ x 0.07″ die cut from plaques were used. Twenty such specimens with no preconditioning and unslit were tested in Igepal CA630 at 50° C.
[2] Minimum pressure required on the injection ram to fill the test plaque mold at a stock temperature of 500° F. and mold temperature of 110° F.

What is claimed is:

1. A composition of matter having improved environmental stress cracking resistance and extrudability properties, which consists essentially of a homogeneous mixture of from about 5 to about 25 parts by weight of a low molecular weight, highly branched polyethylene having a melt index of from about 120 to about 20,000 decigrams per minute and a degree of branching above 2 methyl groups per 100 carbon atoms with from about 75 to about 95 parts by weight of a sparsely branched, high molecular weight polyethylene having a melt index below about 4 decigrams per minute and a degree of branching below about 2 methyl groups per 100 carbon atoms, per 100 parts by weight of said composition, said composition having a melt index of from about 0.1 to about 18 decigrams per minute and a density of from about 0.915 to about 0.935 gram per cc.

2. A composition of matter having improved environmental stress cracking resistance and extrudability properties, which consists essentially of a homogeneous mixture of from about 5 to about 25 parts by weight of a highly branched, low molecular weight polyethylene having a melt index of from about 200 to about 100,000 decigrams per minute, and a degree of branching of from about 3 to about 10 methyl groups per 100 carbon atoms with from about 75 to about 95 parts by weight of a sparsely branched, high molecular weight polyethylene having a melt index of below about 4 decigrams per minute, and a degree of branching of not more than about 1.5 methyl groups per 100 carbon atoms, per 100 parts by weight of said composition, said composition having a melt index of from about 0.1 to about 18 decigrams per minute and a density of from about 0.915 to about 0.935 gram per cc.

3. A composition of matter having improved environmental stress cracking resistance and extrudability properties, which consists essentially of a homogeneous mixture of from about 5 to about 20 parts by weight of a highly branched low molecular weight polyethylene having a melt index of from about 120 to about 20,000 decigrams per minute, a degree of branching above 2 methyl groups per 100 carbon atoms, and a density of from about 0.86 to about 0.91 gram per cc. with from about 80 to about 95 parts by weight of a sparsely branched, high molecular weight polyethylene having a melt index of from about 0.002 to about 0.5 decigram per minute, a degree of branching below 2 methyl groups per 100 carbon atoms, and a density of from about 0.916 to about 0.94 gram per cc., per 100 parts by weight of said composition, said composition having a melt index of from about 0.1 to about 18 decigrams per minute and a density of from about 0.915 to about 0.935 gram per cc.

4. A composition of matter having improved environmental stress cracking resistance and extrudability properties, which consists essentially of a homogeneous mixture of from about 5 to about 10 parts by weight of a highly branched, low molecular weight polyethylene having a melt index of from about 200 to about 20,000 decigrams per minute, a degree of branching above 2 methyl groups per 100 carbon atoms, and a density of from about 0.88 to about 0.90 gram per cc. with from about 80 to about 90 parts by weight of a sparsely branched, high molecular weight polyethylene having a melt index of from about 0.01 to about 0.1 decigram per minute, a degree of branching below 2 methyl groups per 100 carbon atoms, and a density of from about 0.92 to about 0.923 gram per cc., per 100 parts by weight of said composition, said composition having a melt index of from about 0.1 to about 18 decigrams per minute and a density of below about 0.923 gram per cc.

5. A composition of matter having improved environmental stress cracking resistance and moldability properties, which consists essentially of a homogeneous mixture of from about 10 to about 20 parts by weight of a highly branched, low molecular weight polyethylene having a melt index of from about 1,500 to about 10,000 decigrams per minute, a degree of branching above 2 methyl groups per 100 carbon atoms, and a density of from about 0.86 to about 0.91 gram per cc. with from about 80 to about 90 parts by weight of a sparsley branched, high molecular weight polyethylene having a melt index of from about 0.5 to about 4 decigrams per minute, a degree of branching below 2 methyl groups per 100 carbon atoms, and a density of from about 0.92 to about 0.94 gram per cc., per 100 parts by weight of said composition, said composition having a melt index of from about 0.1 to about 18 decigrams per minute and a density of from about 0.915 to about 0.935 gram per cc.

6. A composition of matter having improved environmental stress cracking resistance and moldability properties, which consists essentially of a homogeneous mixture of from about 10 to about 20 parts by weight of a highly branched, low molecular weight polyethylene having a melt index of from about 1,500 to about 10,000 decigrams per minute, a degree of branching above 2 methyl groups per 100 carbon atoms, and a density of from about 0.90 to about 0.91 gram per cc. with from about 80 to about 90 parts by weight of a sparsely branched, high molecular weight polyethylene having a melt index of from about 0.9 to about 2.5 decigrams per minute, a degree of branching below 2 methyl groups per 100 carbon atoms, and a density of from about 0.923 to about 0.928 gram per cc., per 100 parts by weight of said composition, said composition having a melt index of from about 0.1 to about 18 decigrams per minute and a density of below about 0.928 gram per cc.

References Cited by the Examiner

UNITED STATES PATENTS

| | | | |
|---|---|---|---|
| 2,692,259 | 10/54 | Peters | 260—897 |
| 2,698,309 | 12/54 | Thwaites et al. | 260—897 |
| 2,727,024 | 12/55 | Field et al. | 260—897 |
| 2,868,762 | 1/59 | Oakes | 260—897 |
| 2,983,704 | 5/61 | Roedel | 260—897 |

FOREIGN PATENTS 201,195  2/56  Australia.

LEON J. BERCOVITZ, *Primary Examiner.*

D. ARNOLD, *Examiner.*

UNITED STATES PATENT OFFICE
CERTIFICATE OF CORRECTION

Patent No. 3,183,283  May 11, 1965

Frederick P. Reding

It is hereby certified that error appears in the above numbered patent requiring correction and that the said Letters Patent should read as corrected below.

Column 8, line 62, for "80 to about 90" read -- 90 to about 95 --.

Signed and sealed this 7th day of December 1965.

(SEAL)
Attest:

ERNEST W. SWIDER
Attesting Officer

EDWARD J. BRENNER
Commissioner of Patents